(12) United States Patent
Matsukado et al.

(10) Patent No.: US 8,216,693 B2
(45) Date of Patent: Jul. 10, 2012

(54) BRAZING SHEET OF ALUMINUM ALLOY (75) Inventors: Katsuhiro Matsukado, Moka (JP); Akihiro Tsuruno, Moka (JP); Yoshinori Kato, Moka (JP)

(73) Assignee: Kobe Steel, Ltd., Kobe-shi (JP)

( * ) Notice: Subject to any disclaimer, the term of this patent is extended or adjusted under 35 U.S.C. 154(b) by 700 days.

(21) Appl. No.: 12/325,744

(22) Filed: Dec. 1, 2008

(65) Prior Publication Data
US 2009/0162686 A1 Jun. 25, 2009

(30) Foreign Application Priority Data

Dec. 25, 2007 (JP) ................................. 2007-332700

(51) Int. Cl.
*B32B 15/01* (2006.01)
(52) U.S. Cl. .................... 428/654; 428/576; 428/656
(58) Field of Classification Search .................. 428/656, 428/576, 654
See application file for complete search history.

(56) References Cited

U.S. PATENT DOCUMENTS

| | | | |
|---|---|---|---|
| 2,821,014 A | 1/1958 | Miller | |
| 5,732,767 A | 3/1998 | Saperstein | |
| 5,744,255 A | 4/1998 | Doko et al. | |
| 2002/0037426 A1* | 3/2002 | Yamada et al. | 428/654 |
| 2007/0246509 A1* | 10/2007 | Koshigoe et al. | 428/654 |

FOREIGN PATENT DOCUMENTS

| | | |
|---|---|---|
| EP | 0 514 946 A2 | 11/1992 |
| JP | 9-59737 | 3/1997 |
| JP | 11-343531 | 12/1999 |
| JP | 2000-190089 | 7/2000 |
| JP | 3360026 | 10/2002 |
| WO | WO 02/090031 | 11/2002 |

OTHER PUBLICATIONS

Kato et al., JP 3360026 B2, Machine translation.*
U.S. Appl. No. 12/519,023, filed Jun. 12, 2009, Ueda, et al.
Office Action issued Sep. 23, 2011, in Chinese Patent Application No. 200810179825.9 (with partial English-language translation).

* cited by examiner

*Primary Examiner* — Jennifer McNeil
*Assistant Examiner* — Clarisa M Carrizales
(74) *Attorney, Agent, or Firm* — Oblon, Spivak, McClelland, Maier & Neustadt, L.L.P.

(57) ABSTRACT

A brazing sheet of aluminum alloy composed of a core material and a first brazing filler metal covering one surface of the core material. The core material contains as an essential component 0.2-1.0 mass % of Cu and as optional components at least one species of no more than 1.5 mass % of Si, no more than 1.8 mass % of Mn, no more than 0.35 mass % of Ti, and no more than 0.5 mass % of Mg, with the remainder being Al and inevitable impurities. The first brazing filler metal has a liquid phase ratio (X %) at 600° C. and a thickness (Y μm) such that X and Y satisfy the following relationship: (1) $30 \leq X \leq 80$, (2) $Y \geq 25$, and (3) $1000 \leq X \times Y \leq 24000$. The brazing sheet provides good brazeability and maintains high corrosion resistance after brazing on the surface cladded with the brazing filler metal.

12 Claims, 4 Drawing Sheets

BRAZING SHEET OF ALUMINUM ALLOY

BACKGROUND OF THE INVENTION

1. Field of the Invention

The present invention relates to a brazing sheet of aluminum alloy to be used for heat exchangers and the like.

2. Description of the Related Art

A heat exchanger mounted on an automobile is produced by forming a brazing sheet of aluminum alloy into a prescribed shape and then assembling and brazing the formed brazing sheet. Brazing sheets for tubes recently show a trend toward thickness reduction from 0.3-0.5 mm to 0.2 mm or less for lighter heat exchangers. Thinner brazing sheets require higher strength and better corrosion resistance.

One way to reduce the weight of heat exchangers is by using bare fins (not cladded with brazing filler metal). Bare fins are attached to tubes whose surface is cladded with brazing filler metal, and this poses a problem with insufficient corrosion resistance.

To address this problem, there has been proposed a brazing sheet which exhibits good corrosion resistance after brazing on the surface cladded with brazing filler metal. This brazing sheet is composed of a core material of Al—Mn—Cu alloy and a layer of brazing filler metal formed thereon from an Al—Si alloy containing Zn, the latter providing sacrificial protection to the brazed surface. (See Japanese Patent No. 3360026.) According to this patent, corrosion resistance is improved by diffusion of Zn from the brazing filler metal to the core material at the time of brazing, which makes the potential of the brazed surface less noble, thereby providing sacrificial protection.

Unfortunately, the technology disclosed in the above-mentioned patent has the disadvantage that diffusion of Zn leaves only a small amount of Zn in the brazed surface which is not enough to produce a sufficient potential between the brazed surface and the center (in the thickness direction) of the brazing sheet.

Another disadvantage is that Cu diffuses from the core material to the brazing filler metal at the time of brazing and the thus diffused Cu forms a concentrated layer on the brazed surface in the cooling stage that follows brazing. This makes the potential of the brazed surface noble and hence prevents a sufficient potential difference from occurring between the brazed surface and the center of the brazing sheet. As the result, the brazing sheet exposed to a severe corrosive environment suffers pitting soon on account of insufficient sacrificial protection.

In addition, the brazing filler metal that flows at the time of brazing contains a large amount Zn and hence the fillet (brazed part) readily suffers preferential corrosion. This raises the possibility of brazed bare fins peeling off early.

The present invention was completed in view of the foregoing. Thus, it is an object of the present invention to provide a brazing sheet of aluminum alloy which exhibits good corrosion resistance (on the surface cladded with brazing filler metal) after brazing and also exhibits good brazeability.

OBJECT AND SUMMARY OF THE INVENTION

The present inventors found that the controlled thickness of brazing filler metal and the controlled ratio of liquid phase at the brazing temperature play an important role in prevention of the diffusion of Cu from the core material into the surface of the brazing filler metal and also in prevention of the concentration of Cu in the surface after brazing. They also found that in the case of brazing filler metal containing Zn, reduction of Zn contained in the brazing filler metal in liquid state (which occurs at the time of brazing) increases the amount of Zn remaining in the brazed surface. Their findings led to the present invention relating to the brazing sheet of aluminum alloy which provides good sacrificial protection to the brazed surface and forms fillets hardly vulnerable to preferential corrosion, leading to good brazeability, on account of a low Zn content in the brazing filler metal in liquid state.

The gist of the present invention resides in a brazing sheet of aluminum alloy composed of a core material and a first brazing filler metal covering one surface of the core material, wherein the core material contains as an essential component 0.2-1.0 mass % of Cu and as optional components at least one species of no more than 1.5 mass % of Si, no more than 1.8 mass % of Mn, no more than 0.35 mass % of Ti, and no more than 0.5 mass % of Mg, with the remainder being Al and inevitable impurities, and the first brazing filler metal has a liquid phase ratio (X %) at 600° C. and a thickness (Y μm) such that X and Y satisfy the following relationship:

$$30 \leq X \leq 80 \tag{1}$$

$$Y \geq 25 \tag{2}$$

$$1000 \leq X \times Y \leq 24000 \tag{3}$$

The brazing sheet according to the present invention is composed of a Cu-containing core material and a first brazing filler metal thereon, which has a specific liquid phase ratio (at the brazing temperature) and a specific thickness such that they satisfy the conditions (1) to (3) mentioned above. The specific composition prevents Cu from diffusing from the core material into the first brazing filler metal and concentrating in the surface after brazing. Brazing in this manner produces a potential gradient after brazing such that the potential is sufficiently noble from the surface to the center of the brazing filler metal. The result is sufficient sacrificial protection in the case where the first brazing filler metal exposes itself to the corrosive environment and the core material exposes itself to the non-corrosive environment. Satisfying the conditions (1) to (3) means that the brazing filler metal flows and remains in adequate amounts and also changes in thickness in a controlled manner before and after brazing. This leads to good brazeability.

In the brazing sheet mentioned above, the first brazing filler metal may contain 2.0-8.0 mass % of Si and 1.0-6.0 mass % of Zn, with the remainder being Al and inevitable impurities.

The controlled Si and Zn content in the first brazing filler metal makes the brazing sheet of aluminum alloy better in corrosion resistance and brazeability. Another effect is that more Zn remains after brazing on the surface cladded with the first brazing filler metal. This effect makes the surface potential less noble after brazing and produces a sufficient potential difference between the brazed surface and the center of the brazing sheet. The result is marked sacrificial protection.

The brazing sheet mentioned above may additionally have a second brazing filler metal on the other side of the core material, and the second brazing filler metal contains 2.0-8.0 mass % of Si and 1.0-6.0 mass % of Zn, with the remainder being Al and inevitable impurities, and the second brazing filler metal has a liquid phase ratio ($X_1$%) at 600° C. and a thickness ($Y_1$ μm) such that $X_1$ and $Y_1$ satisfy the following relationship:

$$30 \leq X_1 \leq 80 \tag{1a}$$

$$Y_1 \geq 25 \tag{2a}$$

$$1000 \leq X_1 \times Y_1 \leq 24000 \tag{3a}$$

The brazing sheet having the first brazing filler metal (specified above) on one side of the core material and the second brazing filler metal (satisfying the conditions (1) to (3) mentioned above) on the other side of the core material exhibits good corrosion resistance owing to its good sacrificial protection even when both sides thereof are exposed to corrosive environments. Moreover, it permits brazing with any other plates which may have brazing filler metal or may not have brazing filler metal (like bare fins).

The controlled Si and Zn content in the second brazing filler metal makes the brazing sheet of aluminum alloy better in corrosion resistance and brazeability. Another effect is that more Zn remains after brazing on the surface cladded with the second brazing filler metal. This effect makes the surface potential less noble after brazing and produces a sufficient potential difference between the brazed surface and the center of the brazing sheet. The result is marked sacrificial protection.

The brazing sheet of aluminum alloy mentioned above may be modified such that the core material has one side thereof coated with a lining material which contains at least one component selected from Cu (no less than the Cu content in the core material and no more than 1.0 mass %), Si (no more than 1.5 mass %), Mn (0.5-1.8 mass %), and Ti (0.05-0.35 mass %), with the remainder being Al and inevitable impurities.

The brazing sheet of aluminum alloy having a first brazing filler metal on one side thereof and a lining material on the other side thereof as specified above should be used in such a way that the first brazing filler metal exposes itself to a corrosive environment and the lining material exposes itself to a non-corrosive environment if it is placed between corrosive and non-corrosive environments. The lining material facing a non-corrosive environment contains Cu in an amount no less than the Cu content in the core material. This specific Cu content creates a potential gradient in the brazing sheet of aluminum alloy after brazing such that potential from the first brazing filler metal to the lining material is made noble. The result is that the lining material retains sacrificial protection even though it suffers corrosion, which extends the life of the brazing sheet of aluminum alloy.

The brazing sheet of aluminum alloy mentioned above may be modified such that the core material has one side thereof coated with a second brazing filler metal which contains Cu (no less than the Cu content in the core material and no more than 3.0 mass %) and Si (no less than 7 mass % and less than 13 mass %), with the remainder being Al and inevitable impurities.

The brazing sheet of aluminum alloy having a first brazing filler metal on one side thereof and a second brazing filler metal (which contains Cu in an amount no less than the Cu content in the core material) on the other side thereof as specified above should be used in such a way that the first brazing filler metal exposes itself to a corrosive environment and the second brazing filler metal exposes itself to a non-corrosive environment if it is placed between corrosive and non-corrosive environments. It permits brazing with any other plates which may have brazing filler metal or may not have brazing filler metal (like bare fins). In addition, the second brazing filler metal creates a potential gradient in the brazing sheet of aluminum alloy after brazing such that potential from the first brazing filler metal side to the second brazing filler metal side is made noble. The result is that sacrificial protection is retained even though the core material of the second brazing filler side suffers corrosion, which extends the life of the brazing sheet of aluminum alloy.

The brazing sheet of aluminum alloy mentioned above may be modified such that the core material has the other side thereof coated with a sacrificial anodic material of Al—Zn alloy.

The brazing sheet of aluminum alloy having a first brazing filler metal on one side thereof and a sacrificial anodic material on the other side thereof can be used in such a way that both the first brazing filler metal and the sacrificial anodic material expose themselves to corrosive environments. It also exhibits good corrosion resistance even in the case where the brazing filler metal is not necessary on one side thereof.

The brazing sheet of aluminum alloy mentioned above may be modified such that the core material contains 0.3-1.2 mass % of Si, 0.5-1.8 mass % of Mn, 0.05-0.35 mass % of Ti, and 0.05-0.5 mass % of Mg.

The core material containing specific elements in specific amounts as mentioned above makes the brazing sheet of aluminum alloy improve in strength and corrosion resistance after brazing.

BRIEF DESCRIPTION OF THE DRAWINGS

Embodiment(s) of the present invention will be described in detail based on the following figures, wherein.

DESCRIPTION OF THE PREFERRED EMBODIMENTS

The embodiments of the present invention will be described below in more detail with reference the accompanying drawings.

The First Embodiment

Figure 1:
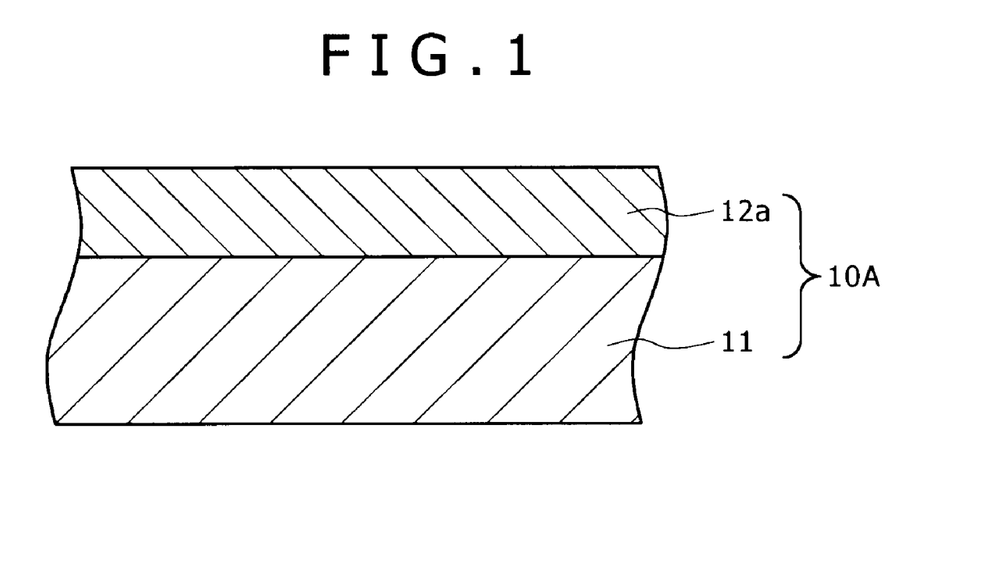
FIG. 1 is a schematic sectional view showing the brazing sheet pertaining to the first embodiment of the present invention.

FIG. 1 is a schematic sectional view showing the brazing sheet of aluminum alloy (simply referred to as brazing sheet hereinafter) pertaining to the first embodiment of the present invention. The brazing sheet 10A has a double-layer structure consisting of a core material 11 and a first brazing filler metal 12a formed on one side of the core material 11.

The brazing sheet 10A is characterized in that the core material 11 contains 0.2-1.0 mass % of Cu and as at least any one of no more than 1.5 mass % of Si, no more than 1.8 mass % of Mn, no more than 0.35 mass % of Ti, and no more than 0.5 mass % of Mg, with the remainder being Al and inevitable impurities. Cu is an essential component, and Si, Mn, Ti, and Mg are optional components. If the core material 11 contains Mn, Ti, and Mg, it is desirable that the Mn content be 0.5-1.8 mass %, the Ti content be 0.05-0.35 mass %, and the Mg content be 0.05-0.5 mass %. Incidentally, the core material 11 is not specifically restricted in thickness; however, a desirable thickness is 50 μm to 1.2 mm in consideration of formability for easy assembling into heat exchangers and weight of heat exchangers.

The first brazing filler metal 12a is an aluminum alloy. It has a liquid phase ratio (X %) at the brazing temperature and a thickness (Y μm) such that X and Y satisfy the following conditions:

$$30 \leq X \leq 80 \tag{1}$$

$$Y \geq 25 \tag{2}$$

$$1000 \leq X \times Y \leq 24000 \tag{3}$$

The first brazing filler metal 12a contains 2.0-8.0 mass % of Si and 1.0-6.0 mass % of Zn, with the remainder being Al and inevitable impurities.

The brazing sheet 10A to be made into heat exchangers, for example, should be arranged such that the first brazing filler metal 12a exposes itself to air (corrosive environment) and the core material 11 exposes itself to fluid such as coolant (noncorrosive environment). The first brazing filler metal 12a having a sufficient thickness that satisfies the condition (2) given above prevents Cu concentration thereon at the time of brazing. This makes potential noble from one side to the other (that side of the brazing sheet 10A which is cladded with the brazing filler metal). Also, the first brazing filler metal 12a containing Zn in an amount specified above satisfies the conditions (1) to (3), and hence it permits Zn to remain sufficiently on the surface after brazing. This makes potential noble from the surface to the center of the brazing sheet after brazing. Therefore, if the brazing sheet 10A is used in such a way that the first brazing filler metal 12a exposes itself to a corrosive environment, it exhibits a marked effect in sacrificial protection. Moreover, satisfying the conditions (1) to (3) mentioned above, the brazing sheet 10A adequately controls the amount of brazing filler metal in fluid form that occurs at the time of brazing. This contributes to good brazeability.

The constituents of the brazing sheet 10A are described below in more detail.

[Core Material 11]

Cu produces an effect of increasing strength after brazing. It also make potential noble to improve corrosion resistance. A Cu content less than 0.2 mass % is not enough to produce a sufficient potential difference between the surface and the center of the brazing sheet after brazing. By contrast, a Cu content in excess of 1.0 mass % is likely to cause burning (local melting) as the core material 11 decreases in melting point. Consequently, the Cu content in the core material 11 should be 0.2-1.0 mass %, preferably 0.3-0.5 mass %.

[Si Content in Core Material 11: no More Than 1.5 Mass %]

Si produces an effect of increasing strength after brazing. Si coexisting with Mg and Mn forms an intermetallic compound of Mg—Si or Al—Mn—Si, which increases strength further after brazing. However, excessive Si more than 1.5 mass % makes the core material 11 decrease in melting point and increases the amount of low-melting phase, which causes the core material 11 to melt. Therefore, the Si content in the core material 11 should be no more than 1.5 mass %. A smaller Si content does not produce the above-mentioned effect. Therefore, the Si content in the core material 11 should preferably be 0.3-1.2 mass %.

[Mn Content in Core Material 11: no More Than 1.8 Mass %]

Mn produces an effect of increasing strength after brazing. Mn increases strength further as its content increases. Mn also makes potential noble, thereby improving corrosion resistance. Excessive Mn more than 1.8 mass % forms a coarse intermetallic compound of Al—Mn, thereby impairing formability and corrosion resistance. Therefore, the Mn content in the core material 11 should be no more than 1.8 mass %. Incidentally, an Mn content less than 0.5 mass % is not enough to produce the above-mentioned effect. Therefore, the Mn content in the core material 11 should preferably be 0.5-1.8 mass %.

[Ti Content in Core Material 11: no More Than 0.35 Mass %]

Ti in the Al alloy forms a Ti—Al compound which disperses in a laminar state. Since the Ti—Al compound has a potential which is noble, Ti makes corrosion laminar and prevents corrosion from progressing in the depthwise direction (hence avoids pitting). Excessive Ti more than 0.35 mass % forms a coarse Al—Ti intermetallic compound, which impairs formability and corrosion resistance. Therefore, the Ti content in the core material 11 should be no more than 0.35 mass %. A Ti content less than 0.05 mass % does not produce a good effect of making corrosion laminar. Therefore, the Ti content in the core material 11 should preferably be 0.05-0.35 mass %.

[Mg Content in Core Material: 0.05-0.5 Mass %]

Mg produces an effect of increasing strength after brazing. On the other hand, Mg impairs brazeability under controlled brazing and hence Mg in excess of 0.5 mass % diffuses to the first brazing filler metal 12a and greatly deteriorates brazeability. Therefore, the Mg content in the core material 11 should be no more than 0.5 mass %. Incidentally, an Mg content less than 0.05 mass % is not enough to increase strength after brazing. Therefore, the Mg content in the core material 11 should preferably be 0.05-0.5 mass %.

[The First Brazing Filler Metal 12a]

[Liquid Phase Ratio (X %) at 600° C.: $30 \leq X \leq 80$]

The first brazing filler metal 12a should have a controlled liquid phase ratio (X %) at 600° C., so that it has controlled flow-ability at the time of brazing and remains in a controlled amount on the surface of the core material 11 after brazing. With a liquid phase ratio (X) smaller than 30%, the first brazing filler metal 12a is poor in flowability and hence does not exhibit good brazeability. By contrast, with a liquid phase ratio (X) larger than 80%, the first brazing filler metal does not remain sufficiently after brazing and hence does not produce a good effect of sacrificial protection due to remaining brazing filler metal. Therefore, the liquid phase ratio (X %) at the brazing temperature should be 30-80%, preferably 45-80%. Incidentally, the liquid phase ratio (X %) at the brazing temperature is calculated by the standard software for thermodynamic calculation (such as Thermo-Calc) from the composition of the brazing filler metal used in the manufacturing process of the brazing sheet 10A. "%" for the liquid phase ratio (X) is usually in terms of "mass %".

[Thickness (Y) of Brazing Filler Metal: $Y \geq 25$ μm]

The brazing filler metal should have an adequate thickness because Cu diffuses from the core material 11 to the first brazing filler metal 12a in the manufacturing process of the brazing sheet 10A or in the brazing process for production of heat exchangers from the brazing sheet 10A. As the thickness of the first brazing filler metal 12a increases, the Cu concentration in the first brazing filler metal 12a decreases and hence the Cu concentration on the surface also decreases after brazing. A thickness less than 25 μm is too small to prevent the concentration of Cu sufficiently. Therefore, the thickness (Y) of the first brazing filler metal 12a should be no smaller than 25 μm. The upper limit of the thickness (Y) is not specifically restricted because it depends on the thickness of the brazing sheet 10A and the density of joints. It is desirably be half the thickness of the brazing sheet. A preferred range of Y is from one-tenth to one-third the thickness of the brazing sheet.

[Product of Liquid Phase Ratio (X) and Thickness of Brazing Filler Metal (Y): 1000≦X×Y≦24000]

The liquid phase ratio (X) and the thickness of the brazing filler metal (Y) determine the amount of brazing filler metal in fluid state at the time of brazing and the amount of residual brazing filler metal. Their proper regulation ensures that an adequate amount of brazing filler metal in fluid state occurs when fins are brazed, and this leads to good brazeability. Their proper regulation also ensures that an adequate amount of brazing filler metal remains to exhibit good sacrificial protection arising from residual brazing filler metal. If the liquid phase ratio (X) and the thickness of the brazing filler metal (Y) are such that their product is less than 1000, satisfactory brazeability is not achieved because there is not a sufficient amount of brazing filler metal in fluid state. In such a case, fillet does not form sufficiently and the resulting joint is poor in strength. The product of X and Y that exceeds 24000 suggests that there is such a large amount of brazing filler metal in fluid state that the brazing sheet 10A greatly changes in thickness before and after brazing. This causes core cracking and erosion of the core material 11 by the excess brazing filler metal in fluid state. The resulting brazing sheet is poor in corrosion resistance. Therefore, the product of X and Y (or X×Y) should be 1000-24000, preferably 1200-22800.

Si lowers the melting point of Al alloy as the major constituent of the first brazing filler metal 12a. It also increases the liquid phase ratio and flowability at the brazing temperature. With an Si content less than 2.0 mass %, the first brazing filler metal 12a is poor in brazeability due to insufficient amount of brazing filler metal that flows at the time of brazing. By contrast, with an Si content more than 8.0 mass %, the first brazing filler metal 12a causes defective brazing, such as core cracking due to decreased sheet thickness and erosion on the core material 11, because it gives rise to an excess amount of brazing filler metal that flows. Therefore, if the first brazing filler metal 12a contains Si, the Si content therein should be 2.0-8.0 mass %.

[Zn Content in the First Brazing Filler Metal: 1.0-6.0 Mass %]

Zn make less noble the potential of Al alloy as the major constituent of the first brazing filler metal 12a. It also lowers the melting point and increases the liquid phase ratio. Zn in an amount less than 1.0 mass % hardly contributes to corrosion resistance because it merely remains in an extremely small amount on the surface after brazing. By contrast, Zn in an amount more than 6.0 mass % causes the fillet to undergo preferential corrosion because of the increased Zn concentration in the brazing filler metal that flows. Therefore, if the first brazing filler metal 12a contains Zn, the Zn content therein should be 1.0-6.0 mass %.

Incidentally, since both Si and Zn lower the melting point of the Al alloy and increase the liquid phase ratio, the amount of Si and Zn should be so established by thermodynamic calculations as to satisfy the condition (1). Then, the thickness (Y) should be so established as to satisfy the conditions (2) and (3). Also, the first brazing filler metal may contain, in addition to the above-mentioned components, optional components such as In and Sn, that make the potential less noble. For use in a less corrosive environment (where corrosion is shallow), the other side of the core material 11 may be cladded with an Al alloy layer thin enough not to adversely affect the overall characteristics of the brazing sheet.

The Second Embodiment

Figure 2:
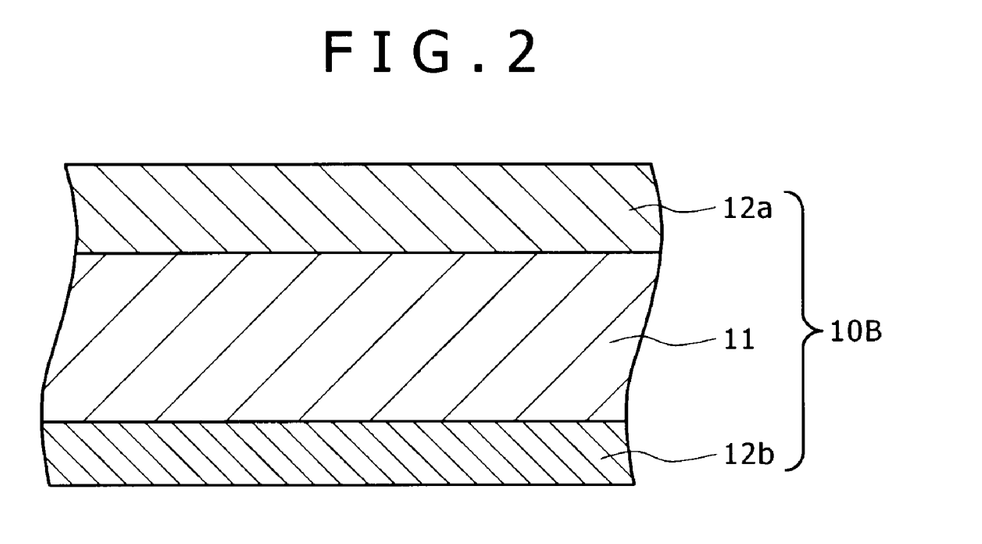
FIG. 2 is a schematic sectional view showing the brazing sheet pertaining to the second embodiment of the present invention.

FIG. 2 is a schematic sectional view showing the brazing sheet of aluminum alloy pertaining to the second embodiment of the present invention. The brazing sheet 10B has a triple-layer structure consisting of a core material 11, a first brazing filler metal 12a formed on one side of the core material 11, and a second brazing filler metal 12b formed on the other side of the core material 11. It is assumed that the brazing sheet 10B is identical with the brazing sheet 10A in the composition and thickness of the core material 11. It is also assumed that the brazing sheet 10B is identical with the brazing sheet 10A in the composition and thickness of the first brazing filler metal 12a. Therefore, the description of the core material 11 and the first brazing filler metal 12a are omitted here.

The second brazing filler metal 12b as a constituent of the brazing sheet 10B satisfies the following conditions:

$$30 \leq X_1 \leq 80 \tag{1a}$$

$$Y_1 \geq 25 \tag{2a}$$

$$1000 \leq X_1 \times Y_1 \leq 24000 \tag{3a}$$

where $X_1$ (%) is the liquid phase ratio at 600° C. and $Y_1$ (μm) is the thickness.

(The values of $X_1$, $Y_1$, and $X_1 \times Y_1$ have the same preferred range as those of the first brazing filler metal 12a mentioned above.)

Consequently, the second brazing filler metal 12b has the same characteristics as the first brazing filler metal 12a, and both the first and second brazing filler metals 12a and 12b can be used in a corrosive environment (or the second brazing filler metal 12b also exhibits good corrosion resistance). This is ascribed to the same reason as mentioned above for the first brazing filler metal. Like the first brazing filler metal 12a, the second brazing filler metal 12b should contain 2.0-8.0 mass % of Si and 1.0-6.0 mass % of Zn, with the remainder being Al and inevitable impurities, so that it exhibits better corrosion resistance.

Incidentally, in the case where the brazing sheet 10B is used in such a way that the second brazing filler metal 12b exposes itself to a corrosive environment, it is not always necessary that the above-mentioned conditions (1a) to (3b) be satisfied and the first brazing filler metal 12b have the above-mentioned composition. For example, the brazing sheet 10B may be made into a heat exchanger in such a way that the first brazing filler metal 12a exposes itself to air (which is a corrosive environment) and the second brazing filler metal 12b exposes itself to a non-corrosive environment as a matter of course. In this case it is not always necessary that the first brazing filler metal 12a satisfy the above-mentioned conditions (1) to (3) and have the above-mentioned composition.

The Third Embodiment

Figure 3A:
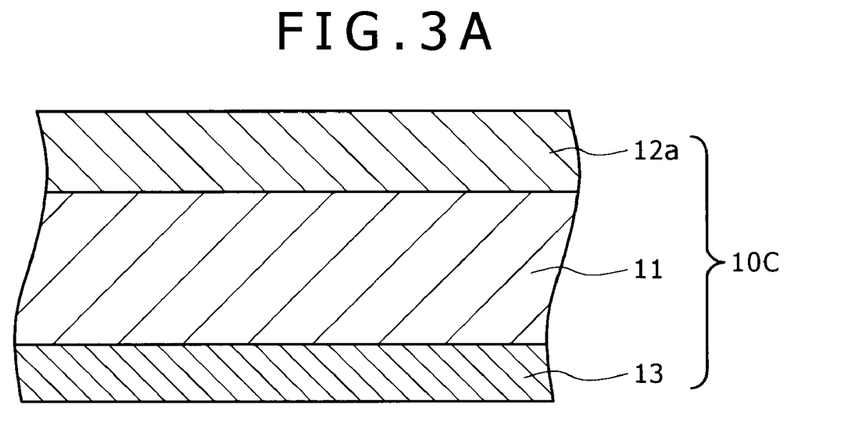
FIG. 3A is a schematic sectional view showing the brazing sheet pertaining to the third embodiment of the present invention.
Figure 3B:
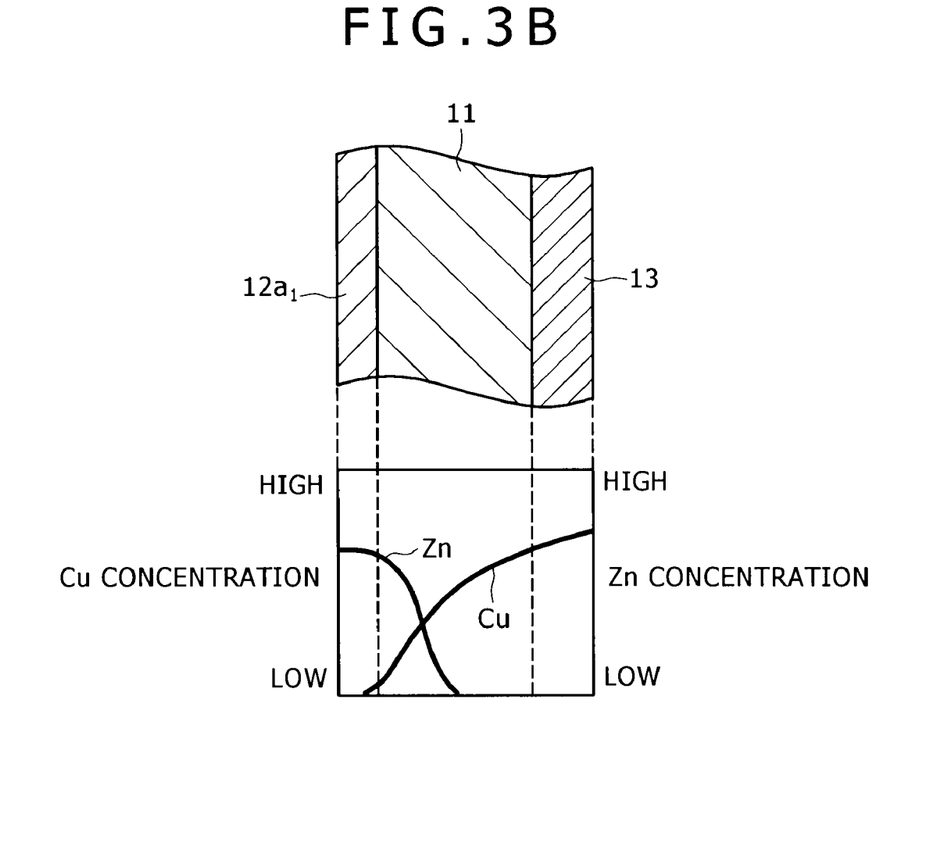
FIG. 3B is a schematic diagram showing the distribution of concentration of Zn and Cu after brazing.

FIG. 3A is a schematic sectional view showing the brazing sheet of aluminum alloy pertaining to the third embodiment of the present invention. FIG. 3B is a schematic diagram showing the distribution of concentration of Zn and Cu which is observed after brazing of the brazing sheet. The brazing sheet 10C has a triple-layer structure consisting of a core material 11, a first brazing filler metal 12a formed on one side of the core material 11, and a lining material 13 formed on the other side of the core material 11. The brazing sheet 10C has the core material 11 and the first brazing filler metal 12a which are substantially identical with those of the brazing sheets 10A and 10B mentioned above. The first brazing filler metal 12a remains on the core material 11 after brazing as indicated by "$12b_1$" in FIG. 3B.

The lining material 13 is a cladding layer of Al alloy on the core material 11. It is distinguished from a sacrificial anodic material in that it does not function as a brazing filler metal and it does not contain Zn. The lining material 13 contains at least one component selected from Cu in an amount no less than the Cu content in the core material 11 and no more than 1.0 mass %, no more than 1.5 mass % of Si, 0.5-1.8 mass % of Mn, and 0.05-0.35 mass % of Ti, with the remainder being Al and inevitable impurities. The lining material 13 on the brazing sheet 10C is not specifically restricted in thickness; it should preferably have a thickness of 0.01-0.3 mm.

The brazing sheet 10C to be made into heat exchangers, for example, should be arranged such that the first brazing filler metal 12a exposes itself to air (corrosive environment) and the lining material 13 exposes itself to fluid such as coolant (non-corrosive environment). In the case where the first brazing filler metal 12a contains a prescribed amount of Zn and the lining material 13 has the above-mentioned composition, the brazing sheet 10C after brazing has the residue of the first brazing filler metal indicated by $12a_1$ in FIG. 3B. In the sectional view shown in FIG. 3B, the Zn concentration decreases and the Cu concentration increases in going from $12a_1$ to 13. Thus, there always exists a potential gradient which is noble from $12a_1$ to 13. This state helps maintain sacrificial protection even when corrosion reaches the lining material 13, which results in prolonged corrosion resistance.

[Lining Material 13]

[Cu Content in the Lining Material 13: no Less Than the Cu Content in the Core Material 11 and no More Than 1.0 Mass %]

Cu increases strength after brazing. It also makes potential noble, thereby improving corrosion resistance. A Cu content in excess of 1.0 mass % would cause burning due to the lowering of melting point. A Cu content less than the Cu content in the core material 11 makes the potential of the core material 11 noble with respect to the lining material 13, which causes pitting that reaches the core material 11. Therefore, the Cu content in the lining material 13 should be no less than the Cu content in the core material 11 and no more than 1.0 mass %. Incidentally, a Cu content less than 0.05 mass % is too small to produce the above-mentioned effects. The Cu content in the lining material 13 should preferably be no more than 0.9 mass % and no less than the Cu content in the core material 11, more preferably no less than the Cu content in the core material 11 plus 0.1 mass %.

[Si Content in the Lining Material 13: no More Than 1.5 Mass %]

Si increases strength after brazing. Especially, Si coexisting with Mg and Mn increases strength further after brazing owing to an intermetallic compound of Mg—Si or Al—Mn—Si it forms. However, Si in excess of 1.5 mass % causes the lining material 13 to melt easily because it lowers the melting point and increases the low-melting phase of the lining material 13. Therefore, the Si content in the lining material 13 should be no more than 1.5 mass %. Incidentally, an Si content less than 0.03 mass % is too small to produce the above-mentioned effects. Therefore, the preferred Si content in the lining material 13 should be 0.030-1.2 mass %.

[Mn Content in the Lining Material 13: 0.5-1.8 Mass %]

Mn increases strength after brazing in proportion to its amount. In addition, it makes potential noble, thereby improving corrosion resistance. However, an Mn content less than 0.5 mass % is too small to increase strength. By contrast, Mn contained in excess of 1.8 mass % forms a coarse intermetallic compound of Al—Mn, which deteriorates formability and corrosion resistance. Therefore, the Mn content in the lining material 13 should be 0.5-1.8 mass %.

[Other Elements in the Lining Material 13]

For the lining material 13 to have it potential made noble and to increase in strength, it may be incorporated with no more than 0.3 mass % each of at least one species selected from Cr, Ni, and Zr.

The Fourth Embodiment

Figure 4A:
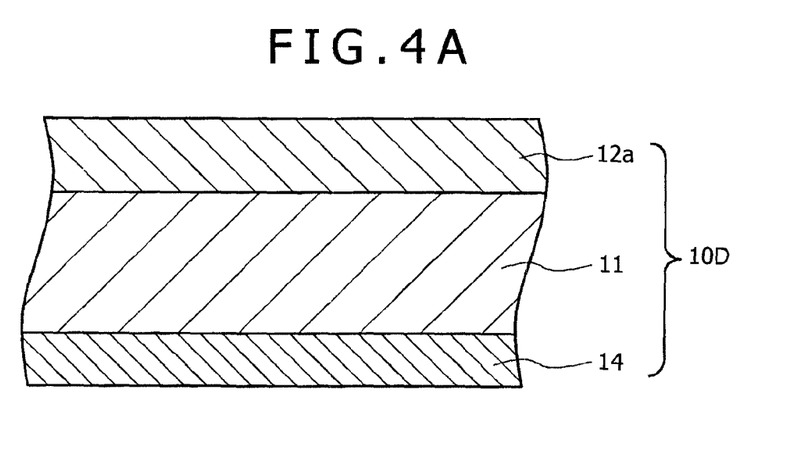
FIG. 4A is a schematic sectional view showing the brazing sheet pertaining to the fourth embodiment of the present invention.
Figure 4B:
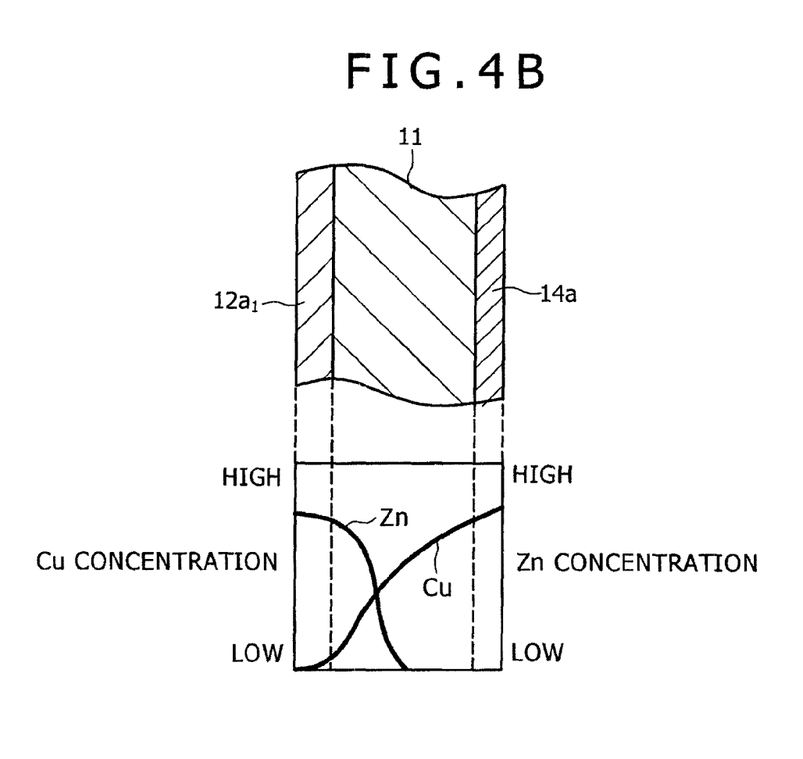
FIG. 4B is a schematic diagram showing the distribution of concentration of Zn and Cu after brazing.

FIG. 4A is a schematic sectional view showing the brazing sheet of aluminum alloy pertaining to the fourth embodiment of the present invention. FIG. 4B is a schematic diagram showing the distribution of concentration of Zn and Cu which is observed after brazing of the brazing sheet. The brazing sheet 10D has a triple-layer structure consisting of a core material 11, a first brazing filler metal 12a formed on one side of the core material 11, and a second brazing filler metal 14 formed on the other side of the core material 11. The brazing sheet 10D has the core material 11 and the first brazing filler metal 12a which are substantially identical with those of the brazing sheets 10A, 10B and 10C mentioned above. The first brazing filler metal 12a and the second brazing filler metal 14 remain on the core material 11 after brazing as indicated by "$12a_1$" and "14a", respectively, in FIG. 4B.

The second brazing filler metal 14 contains Cu in an amount no less than the Cu content in the core material 11 and no more than 3.0 mass % and Si in an amount no less than 7 mass % and less than 13 mass %, with the remainder being Al and inevitable impurities. The second brazing filler metal 14 on the brazing sheet 10D is not specifically restricted in thickness; a preferred thickness is 0.01-0.3 mm.

The brazing sheet 10D to be made into heat exchangers, for example, should be arranged such that the first brazing filler metal 12a exposes itself to air (corrosive environment) and the second brazing filer metal 14 exposes itself to fluid such as coolant (non-corrosive environment). In the case where the first brazing filler metal 12a contains a prescribed amount of Zn and the second brazing filler metal 14 has the above-mentioned Cu-containing composition, the brazing sheet 10D after brazing has the residue of the first brazing filler metal indicated by $12a_1$ in FIG. 4B after brazing as shown in FIG. 4B. As in the case of the brazing sheet 10C mentioned above, the Zn concentration decreases and the Cu concentration increases in going from $12a_1$ to 14a. Thus, there always exists a potential gradient which is noble from $12a_1$ to 14a. This state helps maintain sacrificial protection even when corrosion reaches the second brazing filler metal 14a that remains, which results in prolonged corrosion resistance.

[The Second Brazing Filler Metal 14]

[Cu Content in the Second Brazing Filler Metal 14: no Less Than the Cu Content in the Core Material 11 and no More Than 3.0 Mass %]

Cu increases strength after brazing. It also makes potential noble, thereby improving corrosion resistance. A Cu content in excess of 3.0 mass % would form Cu-rich fillet around which preferential corrosion occurs. With a Cu content less than the Cu content in the core material 11, the second brazing filler metal 14 permits Cu to diffuse from the core material 11 to the second brazing filler metal 14 in the manufacturing process or at the time of brazing. As the result, potential near the second brazing filler metal 14 in the core material 11 become less noble, which promote pitting deep in the core material 11. Therefore, the Cu content in the second brazing filler metal 14 should be no less than the Cu content in the core material 11 and no more than 3.0 mass %. A Cu content less than 0.05 mass % is too small to produce the above-mentioned effects. The preferred Cu content in the second brazing filler metal 14 should be no more than 2.0 mass % and no less than the Cu content in the core material 11, more preferably no less than the Cu content in the core material 11 plus 0.3 mass %.

[Si Content in the Second Brazing Filler Metal 14: no More than 7 mass % and Less Than 13 Mass %]

Si lowers the melting point of the aluminum alloy and increases the liquid phase ratio and flowability at the brazing temperature. An Si content less than 7 mass % is too small to provide sufficient brazing filler metal in fluid state at the time of brazing. By contrast, an Si content more than 13 mass % leads to excessive brazing filler metal in liquid state, which causes core cracking (due to reduced thickness) and defective brazing (due to erosion on the core material 11). Therefore, the Si content in the second brazing filler metal 14 should be no less than 7 mass % and less than 13 mass %. The reason why the Si content in the second brazing filler metal 14 differs from that in the first brazing filler metal 12a is that the second brazing filler metal 14 should be thin and should have a liquid phase ratio close to 100% at the brazing temperature.

[Other Elements in the second Brazing Filler Metal 14]

For the second brazing filler metal 14a that remains after brazing to have it potential made noble, the second brazing filler metal 14 may be incorporated with no more than 0.3 mass % each of at least one species selected from Cr, Ni, and Zr.

[The Liquid Phase Ratio $X_2$ and Thickness $Y_2$ of the Second Brazing Filler Metal 14]

The second brazing filler metal 14 should satisfy the following conditions at the brazing temperature of the brazing sheet 10D.

$$30 \leq X_2 \leq 80 \quad (1b)$$

$$Y_2 \geq 25 \quad (2b)$$

$$1000 \leq X_2 \times Y_2 \leq 24000 \quad (3b)$$

assuming that it has a liquid phase ratio $X_2$ (%) and a thickness $Y_1$ (μm). (The values of $X_2$, $Y_2$, and $X_2 \times Y_2$ have the same preferred range as those of the first brazing filler metal 12a mentioned above.) The one satisfying the foregoing conditions provides sufficient Cu remaining in the residual brazing filler metal after brazing, with the Cu content reduced in fillet. This reduces the amount of elements diffusing from the core material 11 to the first and second brazing filler metals 12a and 14.

The Fifth Embodiment

Figure 5:
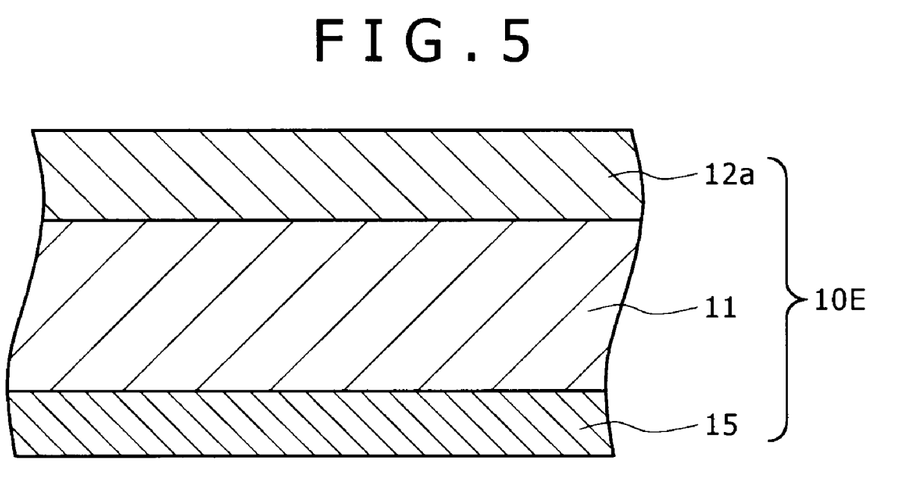
FIG. 5 is a schematic sectional view showing the brazing sheet pertaining to the fifth embodiment of the present invention.

FIG. 5 is a schematic sectional view showing the brazing sheet of aluminum alloy pertaining to the fifth embodiment of the present invention. The brazing sheet 10E has a triple-layer structure consisting of a core material 11, a first brazing filler metal 12a formed on one side of the core material 11, and a sacrificial anodic material 15 formed on the other side of the core material 11. The brazing sheet 10E has the core material 11 and the first brazing filler metal 12a which are substantially identical with those of the brazing sheets 10A to 10D mentioned above. The sacrificial anodic material 15 is composed of Al—Zn alloy; it does not melt at the brazing temperature of the first brazing filler metal 12a and hence it does not function as a brazing filler metal. The brazing sheet 10E can be used in such a way that both the first brazing filler metal 12a and the sacrificial anodic material 15 expose themselves to a corrosive environment. It is suitable for use in an environment where the brazing filler metal on only one side suffices, and it provides good corrosion resistance in such an environment.

The sacrificial anodic material 15 is not specifically restricted in composition to Al—Zn alloy so long as it has a potential which is less noble with respect to the core material 11 and it exhibits sacrificial protection. For example, it may be an Al—Zn alloy containing 1-5 mass % of Zn, with the remainder being Al and inevitable impurities. This alloy may be incorporated with Si and Mn for improvement in strength.

[Method for Producing the Brazing Sheets 10A to 10E]

The following method as an example may be employed to produce the brazing sheets 10A to 10E. The first step is to determine the brazing temperature, the liquid phase ratio (X %) of the first brazing filler metal 12a at the brazing temperature (within the range of $30 \leq X \leq 80$), and the composition of the first brazing filler metal 12a. The second step is to determine the thickness (Y μm) of the first brazing filler metal 12a such that $Y \geq 25$ μm and $1000 \leq X \times Y \leq 24000$, and the thickness and rolling conditions of the brazing sheet. In the case of the brazing sheet 10B, the first and second brazing filler metals 12a and 12b may be designed identically if necessary.

The actual manufacturing process according to the design proceeds as follows. First, ingots are prepared by continuous casting from aluminum alloys for the core material, the first brazing filler metal, the second brazing filler metal, the lining material, and the sacrificial anodic material. The ingots undergo facing and soaking, if necessary. The ingots except for the first one are hot-rolled to a desired thickness, followed by cutting to a desired size. Thus there are obtained the first brazing filler metal 12a, the second brazing filler metal 12b, the second brazing filler metal 14, the lining material 13, and the sacrificial anodic material 15.

On one side of the ingot for the core material is placed the first brazing filler metal 12a, and on the other side of the same ingot is placed any one of the second brazing filler metal 12b, the second brazing filler metal 14, the lining material 13, and the sacrificial anodic material 15, according to need, so that the desired cladding ratio is achieved. The resulting assembly is heated above 400° C. and then hot-rolled for contact bonding. The hot-rolled sheet undergoes cold rolling, intermediate annealing, and cold rolling sequentially until the desired thickness is attained. The hot-rolled sheet may optionally undergo rough annealing for adjustment of element distribution in the alloy, after contact bonding (by hot rolling) and before cold rolling. The intermediate annealing should preferably last for 3 hours or longer at 350-450° C. The sheet which has been rolled to a desired thickness may optionally undergo finish annealing that imparts good formability. The finish annealing makes the material soft and extensible, thereby improving processability.

EXAMPLES

The preceding sections have dealt with the preferred embodiments of the present invention. The following describes in detail the examples which verify the effects of the present invention in comparison with the comparative examples which do not meet the requirements of the present invention. However, the scope of the present invention is not restricted to the examples. The terms "the first brazing filler metal" and "the second brazing filler metal" which are used below have the same meaning as the terms "the first brazing filler metal 12a" and "the second brazing filler metal 12b" which were used in the embodiments mentioned above.

[Preparation of Sample Materials]

The core materials and lining materials (each having the composition shown in Table 1) and the brazing filler metals and sacrificial anodic materials (each having the composition shown in Tables 3 and 4) were prepared in the usual way. Each of them was placed on top of the other according to the combination specified in Tables 3 and 4. The resulting assembly was hot-rolled for cladding at 450° C. The sheet thickness was reduced to 0.3 mm in the hot rolling. This step was further followed by intermediate annealing at 400° C. for 5 hours and subsequent cold rolling with a draft of 50% so that the sheet thickness was reduced to 0.2 mm or 0.1 mm. After finish annealing at 300° C. for 3 hours, there were obtained the sample sheets (of triple-layer structure) shown in Tables 3 and 4.

Incidentally, the brazing filler metals are classified into three categories as shown in Table 2. Those which contain Zn but do not contain Cu are referred to as "brazing filler metal A". Those which contain Cu but do not contain Zn are designated as "brazing filler metal B" and "brazing filler metal C" according their thickness, as shown in Tables 3 and 4. The first brazing filler metal is the brazing filler metal A only; however, the second brazing filler metal is any one of the brazing filler metal A as well as the brazing filler metal B and brazing filler metal C. Therefore, in Tables 3 and 4, the liquid phase ratio and thickness of the second brazing filler metal are expressed in terms of X and Y in the same way as in the first brazing filler metal.

[Preparation of Heat-Treated Samples and Test Specimens]

Each sample of the brazing sheets prepared as mentioned above was tested as follows. First, the surface of the first brazing filler metal was coated with a commercial non-corrosive flux (3 g/m$^2$). The flux-coated sheet was hung by a jig and held at 590-600° C. for 2 minutes in an environment containing less than 200 ppm of oxygen. In this way there was obtained a brazed and heat-treated sample. A test specimen in a specific shape was cut out of the sample, and it was used for corrosion test. Incidentally, the column entitled "Preparation of heat-treated sample" in Tables 3 and 4 contains symbols "○" and "×". The former symbol means that "preparation of heat-treated samples was possible" and the latter symbol means that "preparation of heat-treated samples was impossible" due to problems involved in processability and melting point.

[Corrosion Test]

A test specimen measuring 60×50 mm was cut out of the brazed heat-treated sample. A sealing tape was applied to that side of the test specimen which is opposite to the first brazing filler material and also to the edges of the test specimen. The sealed test specimen was subjected to corrosion test for 1000 hours according to CASS method (JIS Z 2371). After the corrosion test, the maximum depth of corrosion was measured and the minimum remaining sheet thickness (equal to the difference between the thickness before testing and the maximum depth of corrosion) was calculated. The test specimens were regarded as acceptable if the minimum remaining sheet thickness (before brazing) is no less than 40% (or no less than 80 μm for the thickness of 0.2 mm and no less than 400 μm for the thickness of 1.0 mm).

[Test for Corrosion at Joints]

The brazing sheet was tested for corrosion resistance on the assumption that it will be used for heat exchangers. A test specimen in a prescribed shape was cut out of the sheet sample. A piece of bare fin (Al-2Zn) was brazed to the surface of the first brazing filler metal in the same way as brazing and heat treatment mentioned above. The surface opposite to the first brazing filler metal and the edges of the sheet were sealed, and the unsealed surface was subjected to CASS test (JIS Z 2371). After corrosion test, the surrounding of the joint between the brazing sheet and the bare fin was visually inspected for corrosion. The specimens are regarded as acceptable or unacceptable according to the absence or presence of corrosion as indicated by symbols "○" and "×", respectively, in Tables 3 and 4.

After the foregoing test, the specimens were examined for the ratio of the part in which fillet firmly joins together the brazing sheet and the bare fin. (This ratio is referred to as "joint survival ratio".) The joint survival ratio is defined as [length of fillet after test] divided by [width of bare fin] multiplied by 100(%). The specimens are regarded as acceptable in the joint corrosion test if they have a joint survival ratio no smaller than 60%. Preferential corrosion in the surroundings of the joint was judged by observing all the surfaces of the brazing filler metals (or the surface of the first brazing filler metal exposing itself to the corrosive environment and the surface of the second brazing filler metal exposing itself to the non-corrosive environment).

[Evaluation of Brazeability of the Second Brazing Filler Metal]

This test consists of cutting a specimen in a prescribed shape out of the sample having the second brazing filler metal and brazing a piece of bare fin (Al-2Zn) to the surface of the second brazing filler metal in the same way as brazing and heat treatment mentioned above. The brazed samples were examined for discontinuity of brazing. The samples are regarded as acceptable or unacceptable according to the absence or presence of discontinuity of brazing as indicated by symbols "○" and "×", respectively, in Tables 3 and 4.

TABLE 1

| | Composition No. | Composition (mass %) | | | | | |
|---|---|---|---|---|---|---|---|
| | | Cu | Si | Mn | Ti | Mg | Al |
| Core material and lining material | C1 | 0.50 | 0.90 | 1.65 | 0.15 | — | Remainder |
| | C2 | 0.10 | 0.90 | 1.65 | 0.15 | — | Remainder |
| | C3 | 0.20 | 0.90 | 1.65 | 0.15 | — | Remainder |
| | C4 | 0.90 | 0.90 | 1.65 | 0.15 | — | Remainder |
| | C5 | 1.20 | 0.90 | 1.65 | 0.15 | — | Remainder |
| | C6 | 0.50 | 0.30 | 1.65 | 0.15 | — | Remainder |
| | C7 | 0.50 | 1.50 | 1.65 | 0.15 | — | Remainder |
| | C8 | 0.50 | 1.70 | 1.65 | 0.15 | — | Remainder |
| | C9 | 0.50 | 0.90 | 0.40 | 0.15 | — | Remainder |
| | C10 | 0.50 | 0.90 | 1.80 | 0.15 | — | Remainder |
| | C11 | 0.50 | 0.90 | 2.00 | 0.15 | — | Remainder |
| | C12 | 0.50 | 0.90 | 1.65 | 0.04 | — | Remainder |
| | C13 | 0.50 | 0.90 | 1.65 | 0.30 | — | Remainder |
| | C14 | 0.50 | 0.90 | 1.65 | 0.38 | — | Remainder |
| | C15 | 0.50 | 0.90 | 1.65 | 0.15 | 0.05 | Remainder |
| | C16 | 0.50 | 0.90 | 1.65 | 0.15 | 0.30 | Remainder |
| | C17 | 0.50 | 0.90 | 1.65 | 0.15 | 0.60 | Remainder |

(Remarks) "Remainder" in the column of Al contains inevitable impurities.

TABLE 2

|  | Composition No. | Composition (mass %) | | | | | | Liquid phase ratio (at 600° C.) |
|---|---|---|---|---|---|---|---|---|
|  |  | Si | Zn | Cu | Mn | Mg | Al |  |
| Brazing filler metal A | F1 | 4.00 | 5.00 | — | — | — | Remainder | 48 |
|  | F2 | 1.00 | 5.00 | — | — | — | Remainder | 4.2 |
|  | F3 | 2.00 | 5.00 | — | — | — | Remainder | 20 |
|  | F4 | 6.00 | 5.00 | — | — | — | Remainder | 76 |
|  | F5 | 8.00 | 5.00 | — | — | — | Remainder | 100 |
|  | F6 | 9.00 | 5.00 | — | — | — | Remainder | 100 |
|  | F7 | 4.00 | 0.50 | — | — | — | Remainder | 36 |
|  | F8 | 4.00 | 1.00 | — | — | — | Remainder | 38 |
|  | F9 | 4.00 | 6.00 | — | — | — | Remainder | 52 |
|  | F10 | 4.00 | 7.00 | — | — | — | Remainder | 55 |
| Brazing filler metal B | G1 | 10.00 | — | 2.00 | — | — | Remainder | — |
|  | G2 | 10.00 | — | 0.10 | — | — | Remainder | — |
|  | G3 | 10.00 | — | 1.00 | — | — | Remainder | — |
|  | G4 | 10.00 | — | 2.50 | — | — | Remainder | — |
|  | G5 | 5.00 | — | 2.00 | — | — | Remainder | — |
|  | G6 | 13.00 | — | 2.00 | — | — | Remainder | — |
| Brazing filler metal C | H1 | 6.5 | — | 2.00 | — | — | Remainder | 75 |
|  | H2 | 4.5 |  | 2.00 |  |  | Remainder | 34 |
|  | H3 | 3 | — | 2.00 | — | — | Remainder | 53 |
| Sacrificial anodic material | S1 | — | 3.00 | — | — | — | Remainder | — |
|  | S2 | — | 3.00 | — | — | 2.00 | Remainder | — |
|  | S3 | 0.90 | 3.00 | — | 1.60 | — | Remainder | — |

(Remarks) "Remainder" in the column of Al contains inevitable impurities.

TABLE 3

| | | Structure of brazing sheet (sample) | | | | | | | | | |
|---|---|---|---|---|---|---|---|---|---|---|---|
| | | Core material | | The first brazing filler metal | | | | The second brazing filler metal | | | Lining material |
| Sample No. | | Composition No. | Thickness (μm) | Composition No. | Thickness Y (μm) | Liquid phase ratio X (%) | X × Y | Composition No. | Thickness (μm) | Liquid phase ratio X (%) | X × Y | Composition No. |
| Examples | 1 | C1 | 130 | F1 | 35 | 48 | 1680 | F1 | 35 | 48 | 1680 | |
| | 2 | C3 | 130 | F1 | 35 | 48 | 1680 | F1 | 35 | 48 | 1680 | |
| | 3 | C4 | 130 | F1 | 35 | 48 | 1680 | F1 | 35 | 48 | 1680 | |
| | 4 | C6 | 130 | F1 | 35 | 48 | 1680 | F1 | 35 | 48 | 1680 | |
| | 5 | C7 | 130 | F1 | 35 | 48 | 1680 | F1 | 35 | 48 | 1680 | |
| | 6 | C9 | 130 | F1 | 35 | 48 | 1680 | F1 | 35 | 48 | 1680 | |
| | 7 | C10 | 130 | F1 | 35 | 48 | 1680 | F1 | 35 | 48 | 1680 | |
| | 8 | C12 | 130 | F1 | 35 | 48 | 1680 | F1 | 35 | 48 | 1680 | |
| | 9 | C13 | 130 | F1 | 35 | 48 | 1680 | F1 | 35 | 48 | 1680 | |
| | 10 | C15 | 130 | F1 | 35 | 48 | 1680 | F1 | 35 | 48 | 1680 | |
| | 11 | C16 | 130 | F1 | 35 | 48 | 1680 | F1 | 35 | 48 | 1680 | |
| | 12 | C1 | 150 | F1 | 25 | 48 | 1200 | F1 | 25 | 48 | 1200 | |
| | 13 | C1 | 100 | F1 | 50 | 48 | 2400 | F1 | 50 | 48 | 2400 | |
| | 14 | C1 | 130 | F4 | 35 | <u>76</u> | 2660 | F4 | 35 | <u>76</u> | 2660 | |
| | 15 | C1 | 130 | F8 | 35 | <u>38</u> | 1330 | F8 | 35 | <u>38</u> | 1330 | |
| | 16 | C1 | 130 | F9 | 35 | <u>52</u> | 1820 | F9 | 35 | <u>52</u> | 1820 | |
| | 17 | C1 | 145 | F1 | 35 | 48 | 1680 | G1 | 20 | | | |
| | 18 | C1 | 145 | F1 | 35 | 48 | 1680 | G2 | 20 | | | |
| | 19 | C1 | 145 | F1 | 35 | 48 | 1680 | G3 | 20 | | | |
| | 20 | C1 | 145 | F1 | 35 | 48 | 1680 | G4 | 20 | | | |
| | 21 | C1 | 130 | F1 | 35 | 48 | 1680 | H1 | 35 | 75 | 2625 | |
| | 22 | C1 | 130 | F1 | 35 | 48 | 1680 | H2 | 35 | 34 | 1190 | |
| | 23 | C1 | 130 | F1 | 35 | 48 | 1680 | H3 | 35 | 53 | 1855 | |
| | 24 | C1 | 145 | F1 | 35 | 48 | 1680 | | | | | |
| | 25 | C1 | 145 | F1 | 35 | 48 | 1680 | | | | | |
| | 26 | C1 | 145 | F1 | 35 | 48 | 1680 | | | | | |
| | 27 | C1 | 145 | F1 | 35 | 48 | 1680 | | | | | C4 |
| | 28 | C3 | 145 | F1 | 35 | 48 | 1680 | | | | | C4 |
| | 29 | C1 | 145 | F1 | 35 | 48 | 1680 | | | | | C1 |
| | 30 | C4 | 145 | F1 | 35 | 48 | 1680 | | | | | C4 |
| | 31 | C1 | 145 | F1 | 35 | 48 | 1680 | | | | | C3 |
| | 32 | C1 | 600 | F1 | 200 | 48 | 9600 | F1 | 200 | 48 | 9600 | |
| | 33 | C1 | 500 | F4 | 300 | 76 | 22800 | F1 | 200 | 48 | 9600 | |

TABLE 3-continued

| | Sample No. | Structure of brazing sheet (sample) | | | Whether or not test specimens can be prepared. | Items of rating | | | | | |
|---|---|---|---|---|---|---|---|---|---|---|---|
| | | Lining material | Sacrificial anodic material | | | Brazeability of the second brazing filler metal | Corrosion test | | Joint corrosion test | | |
| | | | | | | | Minimum remaining sheet thickness (μm) | Rating | Visual judgment | Joint survival ratio (%) | Rating |
| | | Thickness (μm) | Composition No. | Thickness (μm) | | | | | | | |
| Examples | 1 | | | | ○ | ○ | 130 | ○ | ○ | 82 | ○ |
| | 2 | | | | ○ | ○ | 100 | ○ | ○ | 67 | ○ |
| | 3 | | | | ○ | ○ | 95 | ○ | ○ | 94 | ○ |
| | 4 | | | | ○ | ○ | 127 | ○ | ○ | 83 | ○ |
| | 5 | | | | ○ | ○ | 129 | ○ | ○ | 80 | ○ |
| | 6 | | | | ○ | ○ | 131 | ○ | ○ | 83 | ○ |
| | 7 | | | | ○ | ○ | 132 | ○ | ○ | 83 | ○ |
| | 8 | | | | ○ | ○ | 117 | ○ | ○ | 80 | ○ |
| | 9 | | | | ○ | ○ | 135 | ○ | ○ | 81 | ○ |
| | 10 | | | | ○ | ○ | 129 | ○ | ○ | 79 | ○ |
| | 11 | | | | ○ | ○ | 127 | ○ | ○ | 73 | ○ |
| | 12 | | | | ○ | ○ | 111 | ○ | ○ | 87 | ○ |
| | 13 | | | | ○ | ○ | 123 | ○ | ○ | 71 | ○ |
| | 14 | | | | ○ | ○ | 132 | ○ | ○ | 76 | ○ |
| | 15 | | | | ○ | ○ | 110 | ○ | ○ | 87 | ○ |
| | 16 | | | | ○ | ○ | 137 | ○ | ○ | 72 | ○ |
| | 17 | | | | ○ | ○ | 129 | ○ | ○ | 81 | ○ |
| | 18 | | | | ○ | ○ | 131 | ○ | ○ | 80 | ○ |
| | 19 | | | | ○ | ○ | 132 | ○ | ○ | 83 | ○ |
| | 20 | | | | ○ | ○ | 130 | ○ | ○ | 79 | ○ |
| | 21 | | | | ○ | ○ | 128 | ○ | ○ | 83 | ○ |
| | 22 | | | | ○ | ○ | 129 | ○ | ○ | 77 | ○ |
| | 23 | | | | ○ | ○ | 131 | ○ | ○ | 79 | ○ |
| | 24 | | S1 | 20 | ○ | — | 135 | ○ | ○ | 81 | ○ |
| | 25 | | S2 | 20 | ○ | — | 140 | ○ | ○ | 79 | ○ |
| | 26 | | S3 | 20 | ○ | — | 138 | ○ | ○ | 77 | ○ |
| | 27 | 20 | | | ○ | — | 137 | ○ | ○ | 80 | ○ |
| | 28 | 20 | | | ○ | — | 105 | ○ | ○ | 67 | ○ |
| | 29 | 20 | | | ○ | — | 138 | ○ | ○ | 81 | ○ |
| | 30 | 20 | | | ○ | — | 102 | ○ | ○ | 93 | ○ |
| | 31 | 20 | | | ○ | — | 136 | ○ | ○ | 80 | ○ |
| | 32 | | | | ○ | ○ | 720 | ○ | ○ | 73 | ○ |
| | 33 | | | | ○ | ○ | 630 | ○ | ○ | 72 | ○ |

TABLE 4

| | Sample No. | Structure of brazing sheet (sample) | | | | | | | | | |
|---|---|---|---|---|---|---|---|---|---|---|---|
| | | Core material | | The first brazing filler metal | | | | The second brazing filler metal | | | Lining material |
| | | Composition No. | Thickness (μm) | Composition No. | Thickness Y (μm) | Liquid phase ratio X (%) | X × Y | Composition No. | Thickness (μm) | Liquid phase ratio X (%) | X × Y | Composition No. |
| Comparative Examples | 34 | C2 | 130 | F1 | 35 | 48 | 1680 | F1 | 35 | 48 | 1680 | |
| | 35 | C5 | 130 | F1 | 35 | 48 | 1680 | F1 | 35 | 48 | 1680 | |
| | 36 | C8 | 130 | F1 | 35 | 48 | 1680 | F1 | 35 | 48 | 1680 | |
| | 37 | C11 | 130 | F1 | 35 | 48 | 1680 | F1 | 35 | 48 | 1680 | |
| | 38 | C14 | 130 | F1 | 35 | 48 | 1680 | F1 | 35 | 48 | 1680 | |
| | 39 | C17 | 130 | F1 | 35 | 48 | 1680 | F1 | 35 | 48 | 1680 | |
| | 40 | C1 | 140 | F8 | 25 | 38 | 950 | F2 | 35 | 48 | 1680 | |
| | 41 | C1 | 160 | F1 | 20 | 48 | 960 | F1 | 20 | 48 | 960 | |
| | 42 | C1 | 130 | F2 | 35 | 4.2 | 147 | F2 | 35 | 4.2 | 147 | |
| | 43 | C1 | 130 | F3 | 35 | 20 | 700 | F3 | 35 | 20 | 700 | |
| | 44 | C1 | 130 | F5 | 35 | 100 | 3500 | F5 | 35 | 100 | 3500 | |
| | 45 | C1 | 130 | F6 | 35 | 100 | 3500 | F6 | 35 | 100 | 3500 | |
| | 46 | C1 | 130 | F7 | 35 | 36 | 1260 | F7 | 35 | 36 | 1260 | |
| | 47 | C1 | 130 | F10 | 35 | 55 | 1925 | F10 | 35 | 55 | 1925 | |
| | 48 | C1 | 145 | F1 | 35 | 48 | 1680 | | | | | G5 20 |
| | 49 | C1 | 145 | F1 | 35 | 48 | 1680 | | | | | G6 20 |
| | 50 | C1 | 200 | F4 | 400 | 76 | 30400 | F1 | 400 | 30 | 12000 | |

TABLE 4-continued

| | | Structure of brazing sheet (sample) | | | Whether or not test specimens can be prepared. | Brazeability of the second brazing filler metal | Corrosion test Minimum remaining sheet thickness (μm) | Rating | Joint corrosion test Joint Visual judgment | Joint survival ratio (%) | Rating |
|---|---|---|---|---|---|---|---|---|---|---|---|
| | | Lining material Thickness (μm) | Sacrificial anodic material Composition No. | Thickness (μm) | | | | | | | |
| Sample No. | | | | | | | | | | | |
| Comparative Examples | 34 | | | | ○ | ○ | 77 | X | ○ | 68 | ○ |
| | 35 | | | | X | — | — | — | — | — | — |
| | 36 | | | | X | — | — | — | — | — | — |
| | 37 | | | | X | — | — | — | — | — | — |
| | 38 | | | | X | — | — | — | — | — | — |
| | 39 | | | | ○ | X | 127 | ○ | — | — | — |
| | 40 | | | | ○ | ○ | 88 | ○ | — | — | — |
| | 41 | | | | ○ | X | 0 | X | — | — | — |
| | 42 | | | | ○ | X | 135 | ○ | — | — | — |
| | 43 | | | | ○ | X | 137 | ○ | — | — | — |
| | 44 | | | | ○ | ○ | 75 | X | ○ | 87 | ○ |
| | 45 | | | | ○ | ○ | 77 | X | ○ | 85 | ○ |
| | 46 | | | | ○ | ○ | 79 | X | ○ | 88 | ○ |
| | 47 | | | | ○ | ○ | 138 | ○ | ○ | 39 | X |
| | 48 | | | | ○ | X | 133 | ○ | — | — | — |
| | 49 | | | | ○ | X | 126 | ○ | ○ | 88 | ○ |
| | 50 | | | | ○ | ○ | 320 | X | ○ | 87 | ○ |

[Test Results]

The foregoing tests proved that the samples in Examples 1 to 33, which meet the requirements of the present invention, excel in corrosion resistance as indicated by the fact that the smallest value of the minimum remaining sheet thickness is 95 μm in Example 3 and the smallest value of the joint survival ratio is 67% in Example 2. Their good corrosion resistance was also found by visual inspection. They were also good in brazeability with the second brazing filler metal.

In addition to their good corrosion resistance, the samples of Examples 1 to 33 individually have characteristic properties as follows. The sample in Example 3 is superior in fillet corrosion resistance to that in Example 1 owing to an increased amount of Cu. The samples in Examples 4 to 7 proved that Si and Mn in the core material do not greatly affect corrosion resistance. The sample in Example 9 exhibited good corrosion resistance on the side of the first brazing filler metal owing to an increased amount of Ti in the core material. The sample of Example 12 exhibited good corrosion resistance because the first brazing filler metal is thin and the amount of Zn in fillet is small. The sample in Example 15 exhibited good corrosion resistance in fillet owing to a reduced amount of Zn in the first brazing filler metal. The sample in Example 16 exhibited good corrosion resistance in the first brazing filler metal owing to an increased amount of Zn in the first brazing filler metal. The samples in Examples 17 to 23, which have the second brazing filler metal containing Cu, did not suffer corrosion at all, with very little effect on corrosion resistance in the first brazing filler metal. The samples in Examples 24 to 26 proved that the sacrificial anodic material they have produces only an insignificant effect on corrosion resistance in the first brazing filler material. The samples in Examples 27 to 31 proved that the lining material they have produces only an insignificant effect on corrosion resistance in the first brazing filler material.

By contrast, the sample of Comparative Example 34 was poor in corrosion resistance owing to a small amount of Cu in the core material. The sample of Comparative Example 35 suffered the burning of the core material which contains an excess amount of Cu. The sample of Comparative Example 36 suffered the melting of the core material which contains an excess amount of Si. The sample of the Comparative Example 37 was incapable of forming owing to an excess amount of Mn in the core material. The sample of Comparative Example 39 was incapable of brazing owing to an excess amount of Mg in the core material.

The sample of Comparative Example 40 suffered discontinuity of brazing owing to a shortage of the first brazing filler metal. This made it impossible to measure the joint survival ratio. The sample of Comparative Example 41 suffered discontinuity of brazing owing to a shortage of the first brazing filler metal. This made it impossible to measure the joint survival ratio. In addition, it also suffered pitting due to concentration of Cu that occurred in the thin first and second brazing filler metals. The samples of Comparative Examples 42 and 43 suffered discontinuity of brazing owing to a shortage of the first brazing filler metal. This made it impossible to measure the joint survival ratio. The samples of Comparative Examples 44 and 45 were poor in corrosion resistance owing to the large liquid phase ratio X of the first brazing filler metal, which is due to insufficient residual Zn in the surface of the first brazing filler metal after brazing.

The sample of Comparative Example 46 was poor in corrosion resistance owing to a shortage of residual Zn on the surface after brazing, which is due to a low Zn content in the first brazing filler metal. The sample of Comparative Example 47 was poor in fillet corrosion resistance on account of an excess Zn content in the first brazing filler metal. The sample of Comparative Example 48 suffered defective brazing because of an insufficient amount of the second brazing filler metal. The sample of Comparative Example 49 suffered defective brazing because of an excess amount of the second brazing filler metal. The sample of Comparative Example 50 was poor in corrosion resistance due to dissolution (corrosion of the core material with a large amount of Si) that resulted from an excess amount of brazing filler metal. The samples of Comparative Examples 46 to 49 proved that the second brazing filler metal should have a composition within a specific range.

What is claimed is:

1. A brazing sheet of aluminum alloy composed of a core material and a first brazing filler metal covering one surface of said core material, wherein said core material contains as an essential component 0.2-1.0 mass % of Cu and as optional components at least one species of no more than 1.5 mass % of Si, no more than 1.8 mass % of Mn, no more than 0.35 mass % of Ti, and no more than 0.5 mass % of Mg, with the remainder being Al and inevitable impurities, and said first brazing filler metal has a liquid phase ratio (X %) at 600° C. and a thickness (Y μm) such that X and Y satisfy the following relationship:

$$30 \leq X \leq 80 \quad (1)$$

$$Y \geq 25 \quad (2)$$

$$1000 \leq X \times Y \leq 24000 \quad (3),$$

wherein the first brazing filler metal contains 2.0-8.0 mass % of Si and 1.0-6.0 mass % of Zn, with the remainder being Al and inevitable impurities.

2. The brazing sheet of aluminum alloy as defined in claim 1, which additionally has a second brazing filler metal on the other side of the core material, and the second brazing filler metal contains 2.0-8.0 mass % of Si and 1.0-6.0 mass % of Zn, with the remainder being Al and inevitable impurities, and said second brazing filler metal has a liquid phase ratio ($X_1$ %) at 600° C. and a thickness ($Y_1$ μm) such that $X_1$ and $Y_1$ satisfy the following relationship:

$$30 \leq X_1 \leq 80 \quad (1a)$$

$$Y_1 \geq 25 \quad (2a)$$

$$1000 \leq X_1 \times Y_1 \leq 24000 \quad (3a).$$

3. The brazing sheet of claim 2, wherein the second brazing filler metal contains 2.0-6.0 mass % of Si.

4. The brazing sheet of claim 2, wherein the second brazing filler metal contains 5.0-6.0 mass % of Zn.

5. The brazing sheet of aluminum alloy as defined in claim 1, which additionally has a lining material on the other side of said core material, said lining material containing at least one component selected from Cu no less than the Cu content in the core material and no more than 1.0 mass %, Si no more than 1.5 mass %, Mn 0.5-1.8 mass %, and Ti 0.05-0.35 mass %, with the remainder being Al and inevitable impurities.

6. The brazing sheet of aluminum alloy as defined in claim 1, wherein the core material has one side thereof coated with a second brazing filler metal which contains Cu no less than the Cu content in the core material and no more than 3.0 mass % and Si no less than 7 mass % and less than 13 mass %, with the remainder being Al and inevitable impurities.

7. The brazing sheet of aluminum alloy as defined in claim 1, which additionally has a sacrificial anodic material of Al—Zn alloy on the other side thereof the core material.

8. The brazing sheet of aluminum alloy as defined in claim 1, wherein the core material contains 0.3-1.2 mass % of Si, 0.5-1.8 mass % of Mn, 0.05-0.35 mass % of Ti, and 0.05-0.5 mass % of Mg.

9. The brazing sheet of claim 1, wherein the first brazing filler metal contains 2.0-6.0 mass % of Si.

10. The brazing sheet of claim 1, wherein the first brazing filler metal contains 5.0-6.0 mass % of Zn.

11. The brazing sheet according to claim 1, wherein X satisfies the following relationship:

$$30 \leq X \leq 55.$$

12. The brazing sheet of claim 1, wherein X and Y satisfy the following relationship:

$$1000 \leq X \times Y \leq 2660.$$

* * * * *